US012476704B2

(12) United States Patent
Al Sayeed et al.

(10) Patent No.: US 12,476,704 B2
(45) Date of Patent: Nov. 18, 2025

(54) BANDWIDTH OPTIMIZATION FOR CONNECTION VALIDATION IN PRE-OCCUPIED SPECTRUM

(71) Applicant: Ciena Corporation, Hanover, MD (US)

(72) Inventors: Choudhury A. Al Sayeed, Stittsville (CA); Edward Chen, Calgary (CA); Robert Palmer, Nepean (CA); Ran Tang, Kanata (CA)

(73) Assignee: Ciena Corporation, Hanover, MD (US)

( * ) Notice: Subject to any disclaimer, the term of this patent is extended or adjusted under 35 U.S.C. 154(b) by 546 days.

(21) Appl. No.: 18/113,821

(22) Filed: Feb. 24, 2023

(65) Prior Publication Data

US 2024/0291560 A1  Aug. 29, 2024

(51) Int. Cl.
*H04B 10/077* (2013.01)
*H04J 14/02* (2006.01)

(52) U.S. Cl.
CPC ...... *H04B 10/077* (2013.01); *H04J 14/02126* (2023.08)

(58) Field of Classification Search
CPC .......................... H04B 10/077; H04J 14/02126
See application file for complete search history.

(56) References Cited

U.S. PATENT DOCUMENTS

| | | | |
|---|---|---|---|
| 9,276,696 B2 | 3/2016 | Al Sayeed et al. | |
| 9,344,191 B2 | 5/2016 | Al Sayeed et al. | |
| 9,485,013 B2 | 11/2016 | Al Sayeed et al. | |
| 9,577,763 B2 | 2/2017 | Al Sayeed et al. | |
| 9,768,902 B2 | 9/2017 | Al Sayeed et al. | |
| 9,806,803 B2 | 10/2017 | Bownass et al. | |
| 9,882,634 B1 * | 1/2018 | Al Sayeed ............ | H04B 10/40 |
| 9,906,294 B2 | 2/2018 | Al Sayeed et al. | |
| 9,986,317 B1 | 5/2018 | Al Sayeed et al. | |
| 10,361,957 B1 | 7/2019 | MacKay et al. | |
| 10,439,709 B1 | 10/2019 | Al Sayeed | |
| 10,587,339 B1 | 3/2020 | Al Sayeed et al. | |
| 10,686,543 B1 | 6/2020 | Al Sayeed et al. | |
| 10,826,641 B1 | 11/2020 | Al Sayeed et al. | |

(Continued)

FOREIGN PATENT DOCUMENTS

| | | |
|---|---|---|
| EP | 3913824 A1 | 11/2021 |
| EP | 3804184 B1 | 6/2022 |

OTHER PUBLICATIONS

ITU-T, "Generic functional architecture of the optical media network," Telecommunication Standardization Sector of ITU, G.807, Series G: Transmission Systems and Media, Digital Systems and Networks Digital networks—General aspects, Feb. 2020, 64 pp.

*Primary Examiner* — Pranesh K Barua
(74) *Attorney, Agent, or Firm* — Baratta Law PLLC; Lawrence A. Baratta, Jr.

(57) ABSTRACT

A Reconfigurable Optical Add/Drop Multiplexer (ROADM) includes degree components where there are one or more Media Channels (MCs) configured thereon; multiplexer and demultiplexer components; and a controller configured to, responsive to a request for a loopback test on Network Media Channel (NMC) that is part of a configured Media Channel (MC), determine whether there are neighboring channels to the NMC, configure deadbands on optical spectrum based on the determining, cause configuration of a modem for the loopback test, and cause performance of the loopback test with the modem.

20 Claims, 6 Drawing Sheets

(56) References Cited

U.S. PATENT DOCUMENTS

| | | |
|---|---|---|
| 10,833,791 B1 | 11/2020 | Al Sayeed |
| 10,868,614 B2 | 12/2020 | Al Sayeed et al. |
| 10,958,993 B2 | 3/2021 | Swinkels et al. |
| 10,965,373 B1 | 3/2021 | Al Sayeed et al. |
| 10,985,838 B1 | 4/2021 | Al Sayeed et al. |
| 10,992,374 B1 | 4/2021 | Miedema et al. |
| 11,057,690 B2 | 7/2021 | Al Sayeed et al. |
| 11,108,489 B1 | 8/2021 | Archambault et al. |
| 11,444,719 B2 | 9/2022 | Al Sayeed et al. |
| 11,456,814 B2 | 9/2022 | Al Sayeed et al. |
| 2009/0041102 A1* | 2/2009 | Nagatani ......... G01R 31/31709 375/221 |
| 2011/0200324 A1* | 8/2011 | Boertjes ............. H04J 14/0212 398/16 |
| 2018/0343077 A1 | 11/2018 | Al Sayeed et al. |
| 2019/0173602 A1 | 6/2019 | Al Sayeed et al. |
| 2019/0356407 A1 | 11/2019 | Al Sayeed et al. |
| 2021/0152900 A1* | 5/2021 | Al Sayeed ......... H04J 14/0267 |
| 2022/0069903 A1 | 3/2022 | Chen et al. |
| 2024/0137142 A1* | 4/2024 | Cai ..................... H04J 14/0221 |

* cited by examiner

BANDWIDTH OPTIMIZATION FOR CONNECTION VALIDATION IN PRE-OCCUPIED SPECTRUM

FIELD OF THE DISCLOSURE

The present disclosure relates generally to fiber optics. More particularly, the present disclosure relates to systems and methods for Bandwidth Optimization for Connection Validation in Pre-Occupied Spectrum in an optical networking system.

BACKGROUND OF THE DISCLOSURE

Photonic loopback is a technique used in the field for verification. As the name implies, a photonic loopback includes looping a transceiver's transmitter back on its receiver, while traversing a portion of an optical network, such as a degree in a Reconfigurable Optical Add/Drop Multiplexer (ROADM). The photonic loopback is performed in an unoccupied location in the optical spectrum, or in a dedicated loopback portion of spectrum. Also, optical spectrum is being pre-provisioned with so-called Media Channels (MCs). MCs are described, e.g., in ITU-T G.807 "Generic functional architecture of the optical media network," August 2020, the contents of which are incorporated by reference in their entirety. This defines a MC as a media association that represents both the topology (i.e., the path through the media) and the resource (i.e., frequency slot or effective frequency slot) that it occupies. A MC is a large swath of spectrum that has the same A-Z connectivity in the optical network, and it can be pre-provisioned in various filtering devices in the ROADM. Network Media Channels (NMCs), also defined in G.807, can be configured inside an MC as traffic carrying signals. While the MCs provide operational advantages, they do pose a problem with respect to photonic loopbacks as spectrum may be fully configured with MCs even if there are open channels therein.

BRIEF SUMMARY OF THE DISCLOSURE

The present disclosure relates to systems and methods for bandwidth optimization for connection validation in pre-occupied spectrum in an optical networking system. As described herein, the pre-occupied spectrum can include provisioned MCs. The present disclosure supports a loopback test on an NMC in a pre-provisioned or already deployed multi-NMC/MC channel plan environment by (1) either automatically reducing effective bandwidth allocated for loopback test prioritizing the integrity of in-service traffic that forces a downshift in a modem's baud rate for the loopback test, or (2) automatically ensuring effective bandwidth for the loopback channel≥minimum spectral width required for the modem signal in case neighboring channels are not in-service, by adding additional deadbands outside of the loopback NMC bandwidth to avoid filter-roll off penalties. This approach allows operators to perform photonic loopback tests in pre-deployed channel environments for new modem installation in the field, or in post-deployment environment when a modem needs to be replaced, without de-provisioning and re-provisioning the full media channel setup that will potentially impact all NMCs within that MC.

In an embodiment, a Reconfigurable Optical Add/Drop Multiplexer (ROADM) includes one or more of degree and add/drop components where there are one or more Media Channels (MCs) configured thereon; multiplexer and demultiplexer components; and a controller configured to, responsive to a request for a loopback test on Network Media Channel (NMC) that is part of a configured Media Channel (MC), determine whether there are neighboring channels to the NMC, configure deadbands on optical spectrum based on the determining, cause configuration of a modem for the loopback test, and cause performance of the loopback test with the modem.

Responsive to there being neighboring channels to the NMC, the controller cab be configured to configure the deadbands outside edges of the neighboring channels. Responsive to there being no neighboring channels to the NMC including neighboring channels replaced with Amplified Spontaneous Emission (ASE), the controller can be configured to configure the deadbands outside edges of the NMC. Responsive to there being one neighboring channel to the NMC on one side and no neighboring channel on another side, the controller can be configured to configure the deadband on an edge of the one neighboring channel on the one side and on an edge of the NMC on the another side.

The modem can be configured by reducing a baud rate of the modem when deadbands are configured outside edges of the neighboring channels. The MC can include a plurality of NMCs. Alternatively, the MC can include a single NMC. The deadbands can include a portion of optical spectrum used to avoid filter-roll off penalties. The loopback test can include an optical transmission from a transmitter of the modem to a receiver of the modem through one of the degree and add/drop components. Prior to the modem being available, the loopback test can be performed with Amplified Spontaneous Emission (ASE) between the multiplexer and demultiplexer components.

In another embodiment, a method includes, responsive to a request for a loopback test on Network Media Channel (NMC) that is part of a configured Media Channel (MC), determining whether there are neighboring channels to the NMC; configuring deadbands on optical spectrum based on the determining; configuring a modem for the loopback test; and performing the loopback test with the modem.

Responsive to there being neighboring channels to the NMC, the method can further include configuring the deadbands outside edges of the neighboring channels. Responsive to there being no neighboring channels to the NMC including neighboring channels replaced with Amplified Spontaneous Emission (ASE), the method can further include configuring the deadbands outside edges of the NMC. Responsive to there being one neighboring channel to the NMC on one side and no neighboring channel on another side, the method can further include configuring the deadband on an edge of the one neighboring channel on the one side and on an edge of the NMC on the another side.

The modem can be configured by reducing a baud rate of the modem when deadbands are configured outside edges of the neighboring channels. The MC can include a plurality of NMCs. Alternatively, the MC can include a single NMC. The deadbands can include a portion of optical spectrum used to avoid filter-roll off penalties. The loopback test can include an optical transmission from a transmitter of the modem to a receiver of the modem through one of the degree and add/drop components. Prior to the modem being available, the loopback test can be performed with Amplified Spontaneous Emission (ASE) between the multiplexer and demultiplexer components.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for bandwidth optimization for connection validation in pre-occupied spectrum in an optical networking system. As described herein, the pre-occupied spectrum can include provisioned MCs. The present disclosure supports a loopback test on an NMC in a pre-provisioned or already deployed multi-NMC/MC channel plan environment by (1) either automatically reducing effective bandwidth allocated for loopback test prioritizing the integrity of in-service traffic that forces a downshift in a modem's baud rate for the loopback test, or (2) automatically ensuring effective bandwidth for the loopback channel≥minimum spectral width required for the modem signal in case neighboring channels are not in-service, by adding additional deadbands outside of the loopback NMC bandwidth to avoid filter-roll off penalties. This approach allows operators to perform photonic loopback tests in pre-deployed channel environments for new modem installation in the field, or in post-deployment environment when a modem needs to be replaced, without de-provisioning and re-provisioning the full media channel setup that will potentially impact all NMCs within that MC.

Photonic Loopback

Figure 1:
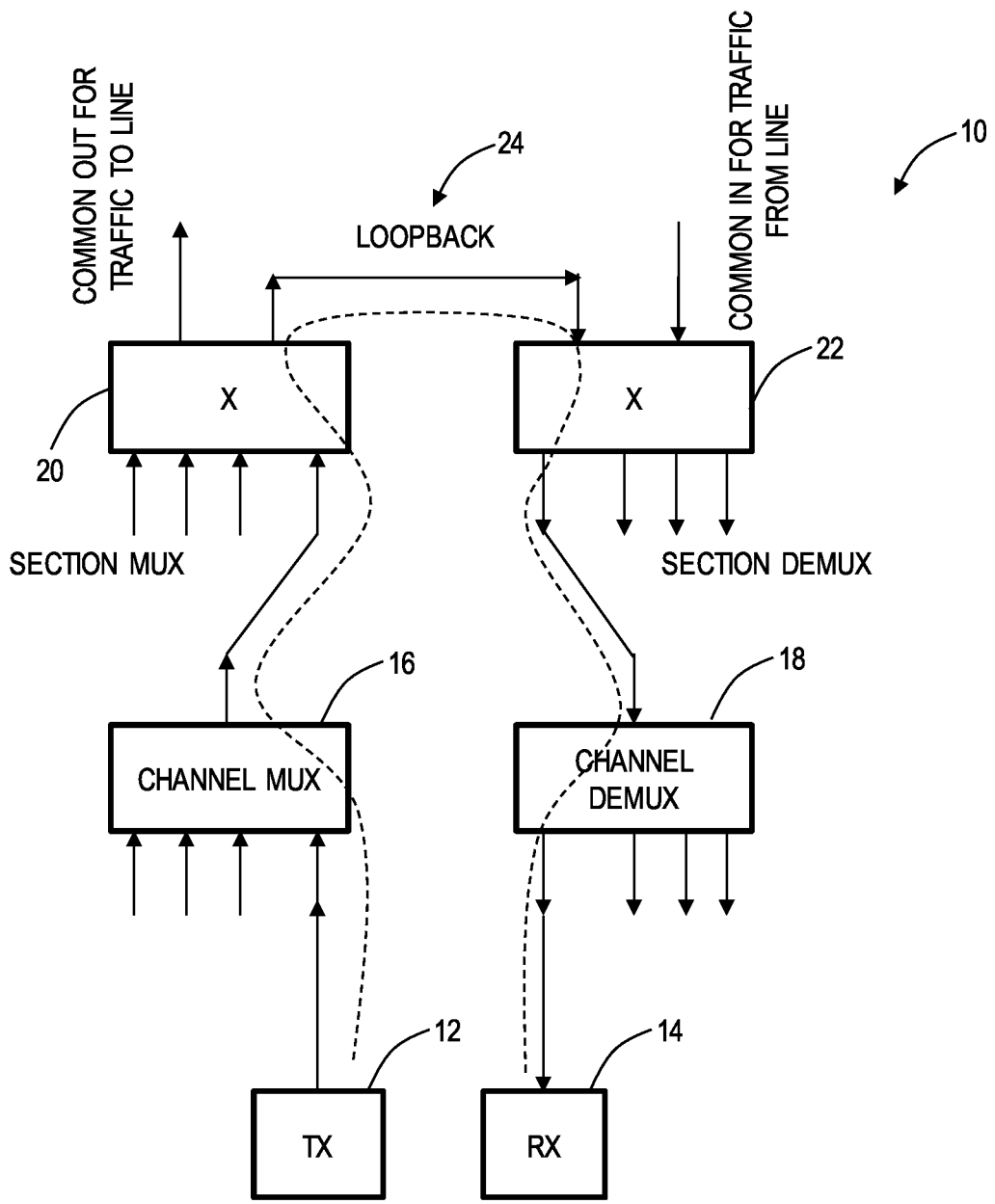
FIG. 1 is a diagram of a portion of a Reconfigurable Optical Add/Drop Multiplexer (ROADM) for illustrating a photonic loopback.

FIG. 1 is a diagram of a portion 10 of a ROADM for illustrating a photonic loopback. In this example, there is a transmitter (Tx) 12 and a receiver (Rx) 14. Note, in practical embodiments, the Tx 12 and the Rx 14 can be on a same module, card, pluggable, etc. The combination of the Tx 12 and the Rx 14 can be referred to as a transceiver, modem, transponder, and the like. The Tx 12 can be connected to a channel multiplexer 16, and the Rx can be connected to a channel demultiplexer 18. Similarly, the channel multiplexer 16 and the channel demultiplexer 18 can be integrated in a same module, card, etc. The channel multiplexer 16 connects to degree components 20 for transmission in the optical network and the channel demultiplexer 18 connects to degree components 22 for reception from the optical network. The degree components 20, 22 can be a Wavelength Selective Switch (WSS) or the like. In a loopback configuration, the degree components 20, 22 can be configured to loopback 24 the Tx 12 to the Rx 14. Note, the loopback 24 is shown at the degree components 20, 22 in FIG. 1, but those skilled in the art will recognize it could also be between the channel multiplexer 16 and the channel demultiplexer 18, as well as at a downstream ROADM, or the like. Although for illustration purposes, loopback path is drawn in FIG. 1 in between section-mux and section-demux elements, such loopback path can also be present between channel-multiplexer 16 and corresponding channel-demultiplexer element 18. Also, the degree components 20, 22 can also be add/drop components, to support local/add drop. That is, add/drop is functionally similar to a degree, except local-facing whereas a degree is network-facing.

A photonic loopback is a technique commonly used in the field for verifying (1) Tx/Rx 12, 14 to/from photonic channel multiplexer/demultiplexer 16, 18 fiber connections and loss validations, (2) For initial deployments in the field, to validate channel multiplexer/demultiplexer 16, 18 to section multiplexer/demultiplexer (not shown in FIG. 1, namely a hierarchical multiplexing structure) fiber connections and loss validations, (3) To validate hardware functionality of spectrum switching elements across the channel multiplexer/demultiplexer 16, 18 and section multiplexer/demultiplexer (e.g., for broken pixels, or internal damages at switch in/out ports on the WSS), (4) And the capability of the modem itself if—(i) the modem can tune to the frequency of interest, and (ii) the modem can lock into its own transmitted traffic and can run error free on local photonic loopback (without the link budget costs of the line transmission system) for a given transmission mode (i.e., at a given Baud and transmission rate)

When a modem is locally validated via loopback, it is left fibered to the photonic line system as "ready" for next service turn up to the line system.

Conventionally, there can be dedicated wavelengths and spectral width for loopback optical connection validation, and this can be primarily due to filter limitations on the loopback path to minimize leakage on the traffic channels due to poor isolation on the WSS. However, such dedicated loopback filter bandwidth (which is typically narrow) does not work for newer modems that cannot support lower baud rates and hence, require more spectral width over the loopback path. Allocating a dedicated spectrum for loopback also imposes limitations in layer 0 spectrum assignments as such loopback spectrum location needs to be used as the last resort for channel routing, and once used for traffic, that degree cannot be used for anymore Tx loopback tests.

There is newer hardware (e.g., in the multiplexing/demultiplexing equipment, WSSs. Modems. etc.) that does not have the dedicated filters anymore along the loopback path. However, they are still limitations due to poor isolation. Such newer hardware allows a loopback test to be done on any free space available in the spectrum, provided that (1) The space cannot overlap with any existing traffic, (2) The space has to be large enough to accommodate the modem signal for loopback, and (2) The Loopback test requires a dedicated 1×NMC/MC configuration. That means, if a large media-channel (MC) is pre-provisioned for traffic in the line-system, even though that MC may not be fully populated and has available space in the spectrum, that space cannot be used for loopback tests. Stated differently, 1×NMC/MC means a single NMC in a MC, not an MC with a plurality of NMCs, one of which is used for loopback. There are network operators who follow pre-deployment traffic models, where they pre-provision all NMCs and MCs during system commission time, even though those NMCs may not be in-service initially. With pre-provisioned traffic, MCs occupying the full or majority of the spectrum, there is not enough free space to run a loopback test. Other than the pre-deployment model, there are also use-cases, where modem Tx/Rx need to be replaced in the field in a multi-NMC/MC configuration, and. in such case, before replacement, the deployed card needs to be tested first in a photonic loopback test to ensure the modem capability and fiber connectivity before resetting the photonic end to end service. Again, existing loopback techniques requiring a dedicated "free" spectral location simply does not work in many such use cases where a "free" spectrum is simply not an available option.

Bandwidth Allocation for Pre-Occupied Spectrum

Again, the present disclosure supports a loopback test on an NMC in a pre-provisioned or already deployed multi-NMC/MC channel plan environment by (1) either automatically reducing effective bandwidth allocated for loopback test prioritizing the integrity of in-service traffic that forces a downshift in a modem's baud rate for the loopback test, or (2) automatically ensuring effective bandwidth for the loopback channel≥minimum spectral width required for the modem signal in case neighboring channels are not in-service, by adding additional deadbands outside of the loopback NMC bandwidth to avoid filter-roll off penalties. This approach allows operators to perform photonic loopback tests in pre-deployed channel environments for new modem installation in the field, or in post-deployment environment when a modem needs to be replaced, without de-provisioning and re-provisioning the full media channel setup that will potentially impact all NMCs within that MC.

Figure 2:
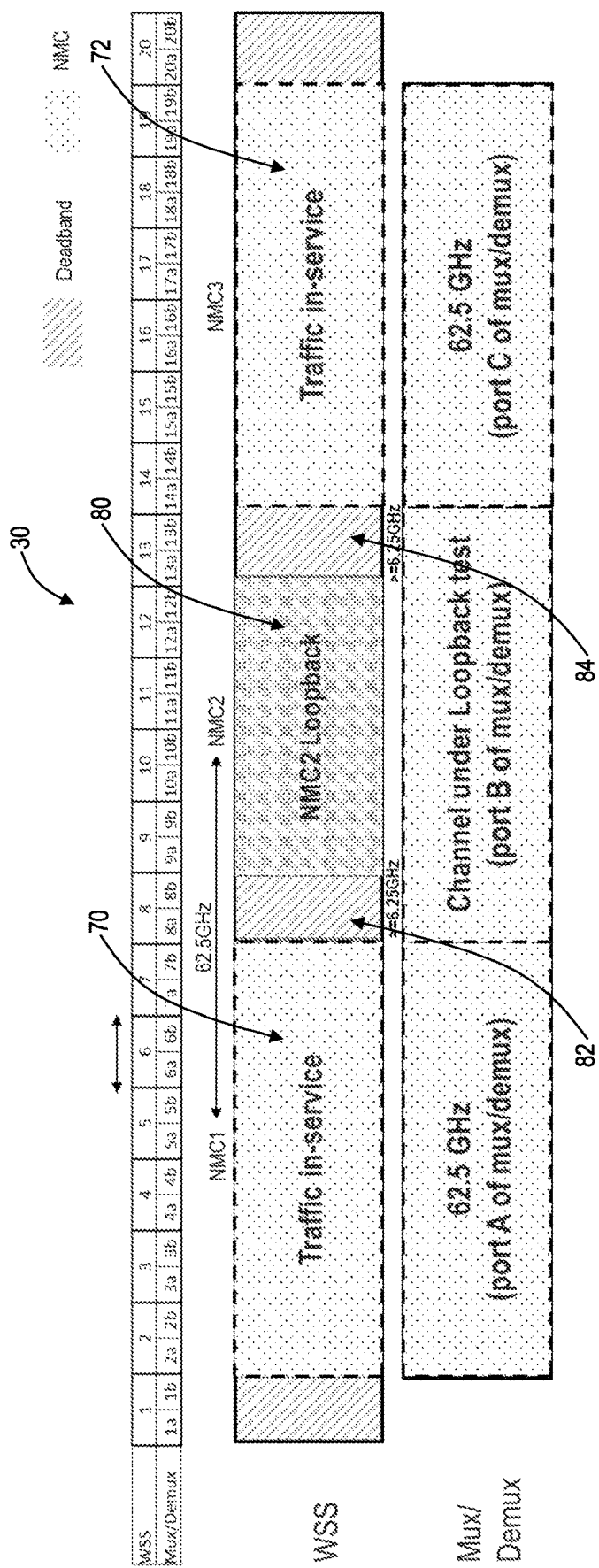
FIGS. 2 and 3 are diagrams of a portion of optical spectrum for illustrating loopback tests on an NMC in a pre-provisioned or already deployed multi-NMC/MC channel plan environment.
Figure 3:
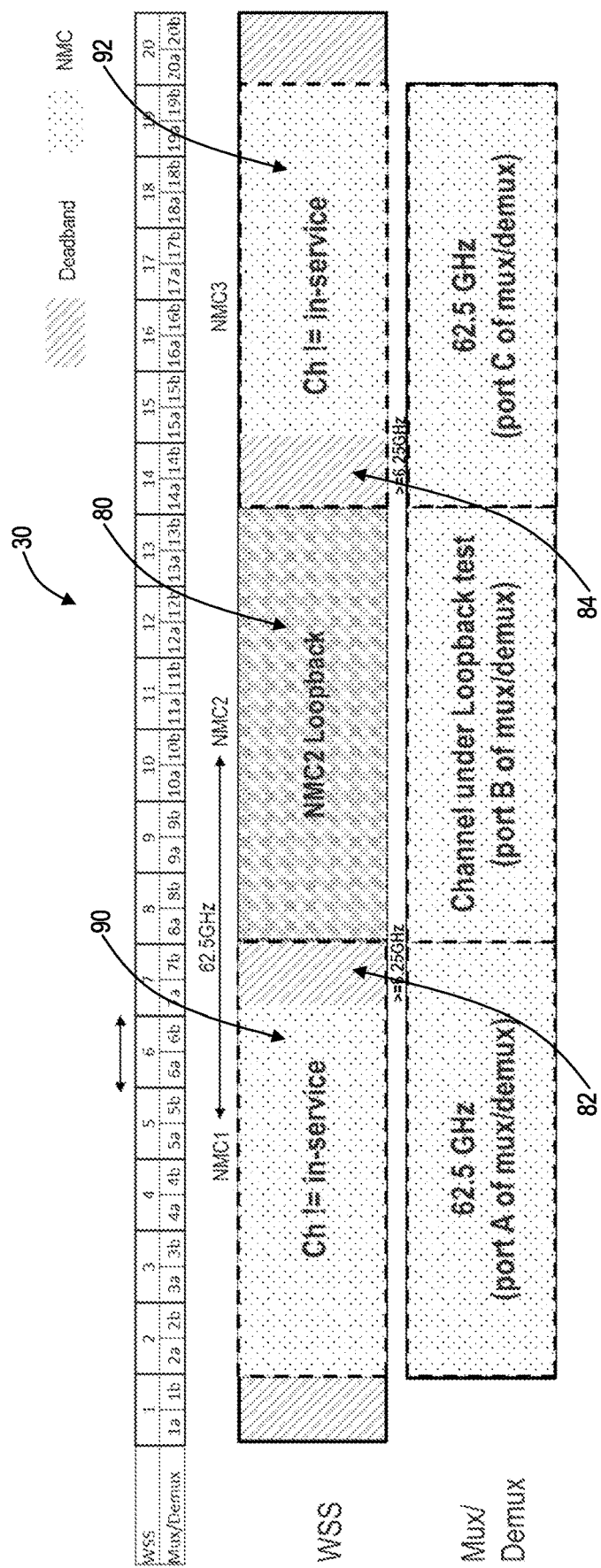

FIGS. 2 and 3 are diagrams of a portion of optical spectrum 30 for illustrating loopback tests on an NMC in a pre-provisioned or already deployed multi-NMC/MC channel plan environment. For configuration, the loopback tests assume the following configuration on the optical spectrum 30 and the portion 10 of the ROADM:

(1) The optical spectrum 30 is pre-occupied with multiple NMC/MC provisioning. (pre-planned channel provisioning, where traffic signals may or may not be present).

(2) At least one of the modems within that MC is either replaced or newly installed to bring up traffic.

(3) There is a requirement is to run optical loopback test on the modem after fibering it up, such as before installers leave the site so that fiber connections and modem's capability on running error free over the local photonic setup can be validated.

Figure 4:
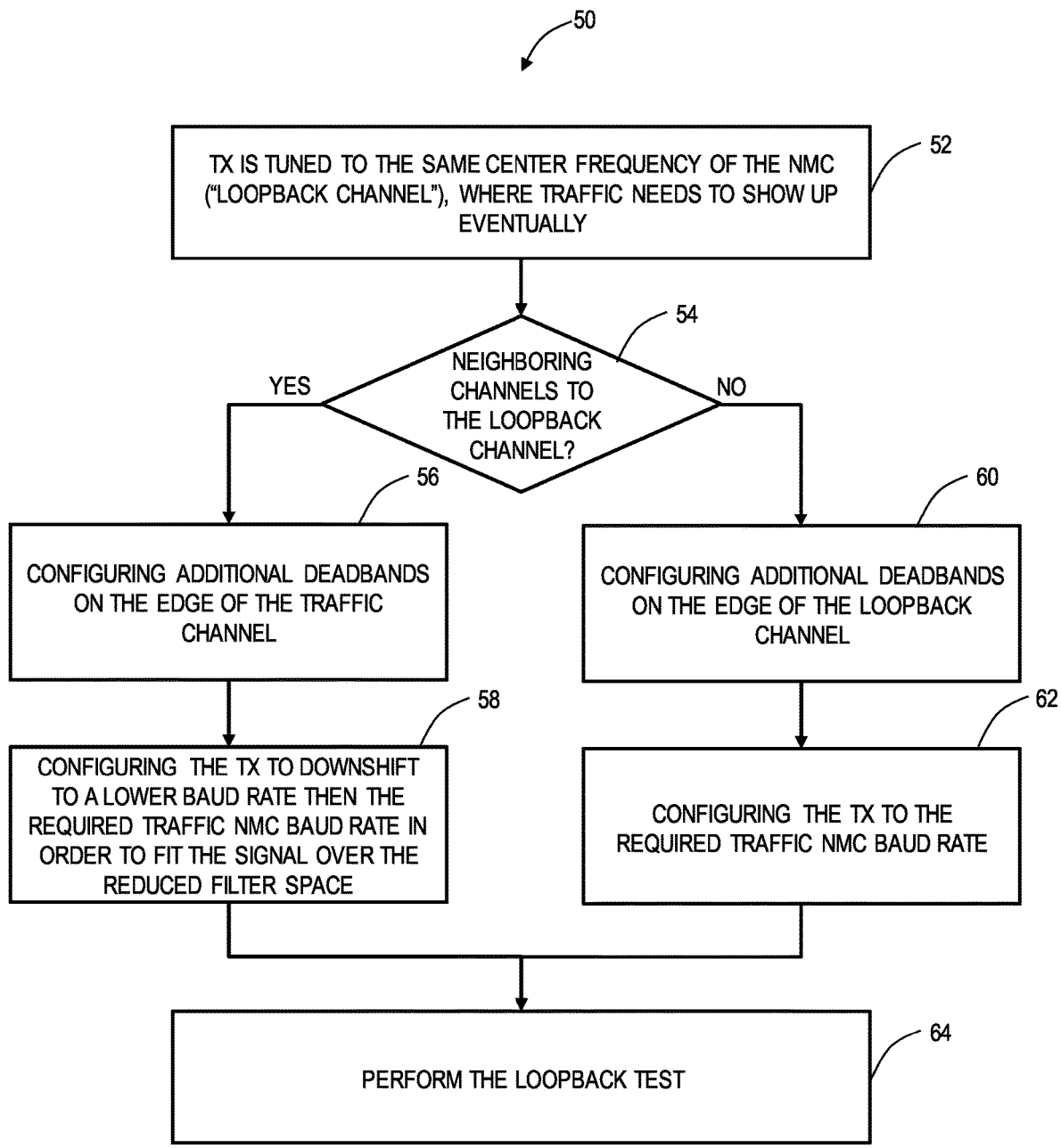
FIG. 4 is a flowchart of a process for loopback tests on an NMC in a pre-provisioned or already deployed multi-NMC/MC channel plan environment.

FIG. 4 is a flowchart of a process 50 for loopback tests on an NMC in a pre-provisioned or already deployed multi-NMC/MC channel plan environment. The process 50 contemplates implementation over the optical spectrum 30 and using the portion 10 of the ROADM, as well as other optical networking configurations.

The process 50 is for a loopback test and assumes the configuration described above, including installation of the modem Tx and Rx in the portion 10 of the ROADM. The Tx is tuned to the same center frequency of the NMC ("loopback channel"), where traffic needs to show up eventually (step 52). The process 50 includes checking to see if there are provisioned neighboring channels to the loopback channel (step 54). The neighboring channels can be on either side of the loopback channel or both.

A key requirement of the loopback channel is extra deadbands since the channel is routed and then looped back in the ROADM portion 10 (i.e., the ROADM degree). Once the NMC channel is installed in the same frequency, there is not the same requirement for deadbands because the installed NMC channel will travel in the same direction as the adjacent neighboring channels. In the loopback configuration, the loopback channel is switched at the degree components 20, 22, at the channel multiplexer 16/the channel demultiplexer 18, and the like. This loopback configuration requires the additional deadbands to avoid impacting the neighboring channels. As described herein and as is known in the art, a deadband is a portion of unequipped optical spectrum 30, used for isolation. In an embodiment, the deadband can be ≥6.25 GHZ, or the like. For example, 6.25 GHz is the resolution bandwidth of a typical WSS.

Whether or not there are neighboring channels (step 54) determine how deadbands are configured for the loopback test. If there are neighboring channels (step 54), the process 50 includes configuring additional deadbands on the edge of the neighboring channels (traffic channels) (step 56). See FIG. 2 for an example where there are neighboring channels 70, 72 on either side of a loopback channel 80. In this case, additional deadbands 82, 84 are added to the edge of the neighboring channels 70, 72, effectively decreasing the spectrum available for the loopback channel 80. This is because the neighboring traffic channels 70, 72 (if present) take precedence over the loopback channel 80, i.e., we do not want the loopback channel 80 to impact the neighboring traffic channels 70, 72. Specifically, the additional deadbands 82, 84 are used in the WSS or other hardware to ensure isolation between the neighboring traffic channels 70, 72 and the loopback channel 80, so that there is not impact to the neighboring traffic channels 70, 72. The additional deadbands 82, 84 are used to avoid any additional filter penalty roll-off impact on the traffic channels that can possibly appear due to switched pixels towards the loopback path.

Of note, the additional deadbands 82, 84 encroach the bandwidth of the loopback channel 80, and this reduces the effective bandwidth (BW) allocated for the loopback test, that in turn, is then published to the Tx to downshift to a lower baud rate then the required traffic NMC baud rate in order to fit the signal over the reduced filter space. That is, the process 50 includes configuring the Tx to downshift to a lower baud rate then the required traffic NMC baud rate in order to fit the signal over the reduced filter space (step 58).

If there are not neighboring channels (step 54), the process 50 includes configuring additional deadbands on the edge of the loopback channel. Here, if the neighboring channels are not in-service (e.g., not carrying traffic), then the loopback channel bandwidth allocation takes priority over the neighboring traffic channels (if present). See FIG. 3 for an example where there are not neighboring channels in spectrum locations 90, 92 on either side of a loopback channel 80. The additional deadbands 82, 84 are allocated on the edge of a loopback channel 80 when the NMC is configured for a loopback test. This is to avoid any additional filter penalty roll-off impact on the loopback channel 80 that can possibly appear due to switched pixels towards the loopback path. This will be done at the expense of reduced filter bandwidth for neighboring channels while loopback in progress on the channel of interest. This step avoids the need for downshifting baud rate for loopback modems. Namely, the process 50 includes configuring the Tx to the required traffic NMC baud rate (step 62).

After steps 58, 62, the process 50 includes performing the loopback test (step 64). In this manner, the loopback test can be performed within an MC without impacting any neighboring channels.

Of note, the example of FIG. 2 illustrates the neighboring channels 70, 72 on both sides of the loopback channel 80, and FIG. 3 illustrates the no neighboring channels in spectrum locations 90, 92 on either side of a loopback channel 80. There can be situations where there is one neighboring channel on one side of the loopback channel 80 and no neighboring channel on the other side of the loopback channel 80. In this case, the deadband can be on the edge of the traffic channel on the side where there is the neighboring channel and on the edge of the loopback channel on the side where there is no neighboring channel.

The process 50 is described with MCs having multiple NMCs. Of note, the process 50 also contemplates operation with a single NMC/MC, where the deadbands are applied on both side of the NMC to switch the full MC width towards loopback.

IS Loopback Test for Multi NMC/MC Example 1

FIG. 2 is a diagram of the portion of optical spectrum 30 for illustrating loopback tests on an NMC in a pre-provisioned or already deployed multi-NMC/MC channel plan environment, specifically where there are neighboring channels to the loopback channel. In this example, there is a 3×NMC/MC at ROADM node with the center NMC for the loopback channel 80. In this example, each NMC requires 62.5 GHz as minimum spectral width to fit the signal for traffic. The additional deadbands 82, 84 are applied at the ROADM mux/demux on both sides of the loopback NMC2, within the NMC allocated spectral width. For example, a WSS switch pixel 8 (6.25 GHZ) is new high-frequency deadband for NMC #1, a WSS pixel 13 (6.25 GHZ) is new low-frequency deadband for NMC #3, and WSS pixels 9-12 allow loopback testing but spectral width<NMC Min spectral width. The modem connected at NMC2 will need to be down-shifted at lower baud rate (e.g., 35 GBaud) to validate signal continuity within the available effective loopback window (≤50 GHz)

IS Loopback Test for Multi NMC/MC Example 2

FIG. 3 is a diagram of the portion of optical spectrum 30 for illustrating loopback tests on an NMC in a pre-provisioned or already deployed multi-NMC/MC channel plan environment, specifically where there are no neighboring channels to the loopback channel. In this example, there is a 3×NMC/MC at ROADM node with the center NMC for the loopback channel 80. Again, each NMC requires 62.5 GHz as minimum spectral width to fit the signal for traffic or for loopback. The additional deadbands 82, 84 applied at the ROADM mux/demux on both sides of the loopback NMC2, outside of the NMC allocated spectral width. The WSS switch pixel 7 (6.25 GHZ) is new high-frequency deadband for NMC #2 under loopback test. The WSS pixel 14 (6.25 GHZ) is new low-frequency deadband for NMC #2 under loopback test. The WSS pixels 7-14 allow loopback testing and effective spectral width≥(NMC2 Min spectral width+2*deadbands). The modem connected at NMC2 can stay on the same Baud rate as will be used for traffic turn up.

Figure 6:
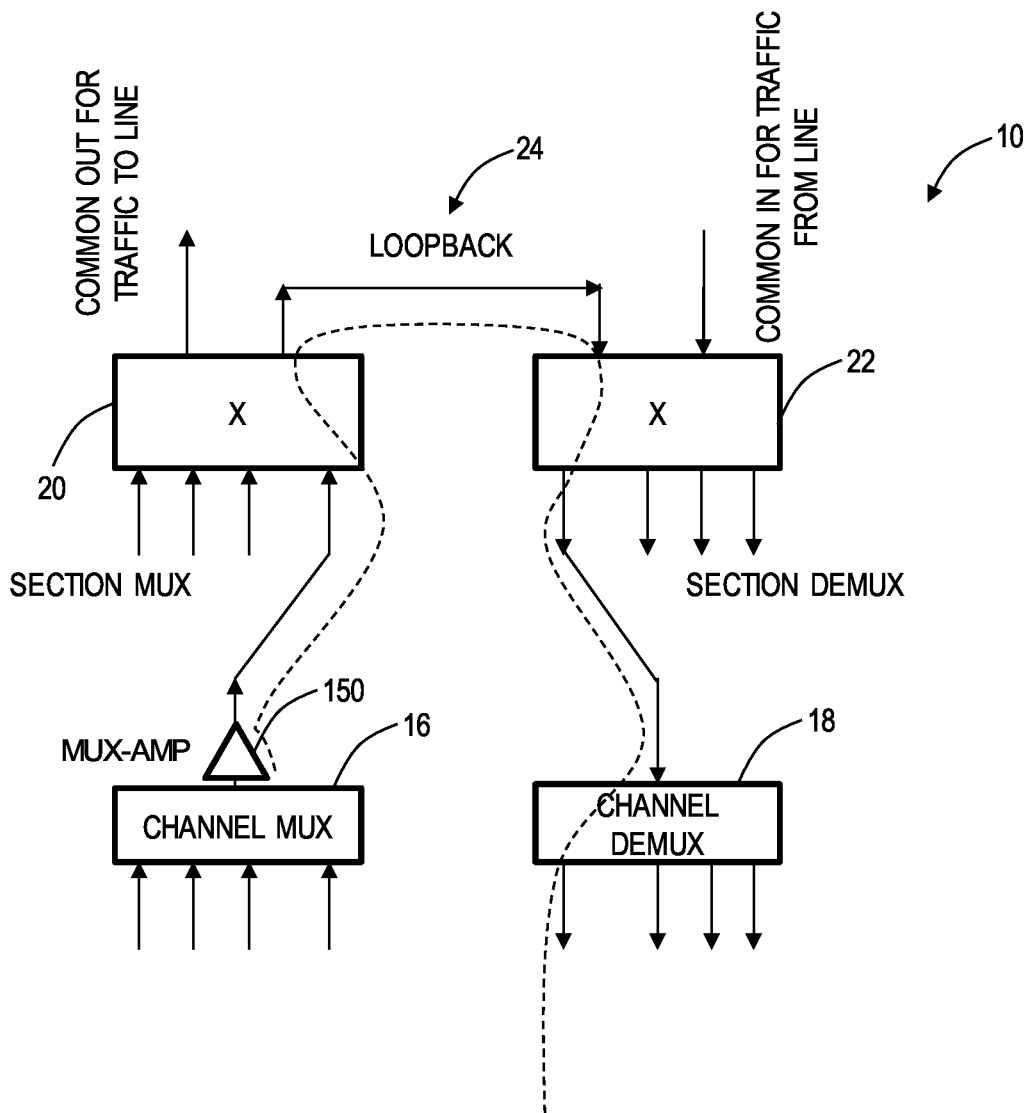
FIG. 6 is a diagram of the portion of the ROADM 10 from FIG. 1 for illustrating a photonic loopback utilizing Amplified Spontaneous Emission (ASE).

In the examples of FIGS. 2 and 3, 6.25 GHz is used considering the minimum pixel granularity of the mux/demux WSS, but those skilled in the art will appreciate other values are contemplated.

Process

Figure 5:
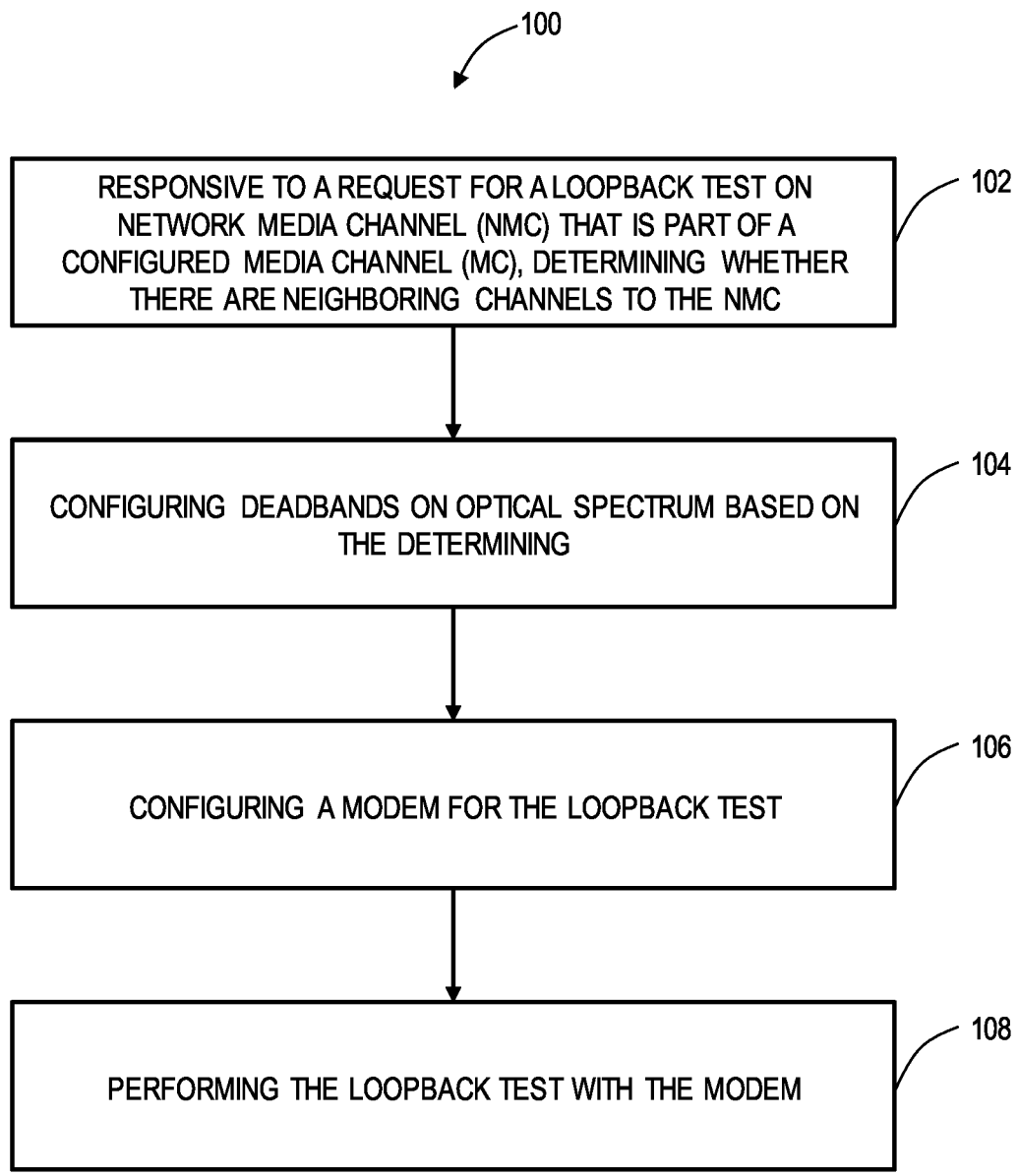
FIG. 5 is a flowchart of a process for bandwidth optimization for connection validation in pre-occupied spectrum in an optical networking system.

FIG. 5 is a flowchart of a process 100 for bandwidth optimization for connection validation in pre-occupied spectrum in an optical networking system. The process 100 contemplated operation in a ROADM that includes one or more of degree and add/drop components where there are one or more Media Channels (MCs) configured thereon; multiplexer and demultiplexer components; and a controller configured to cause implementation of the steps in the process 100.

The process 100 includes, responsive to a request for a loopback test on Network Media Channel (NMC) that is part of a configured Media Channel (MC), determining whether there are neighboring channels to the NMC (step 102); configuring deadbands on optical spectrum based on the determining (step 104); configuring a modem for the loopback test (step 106); and performing the loopback test with the modem (step 108).

Responsive to there being neighboring channels to the NMC, the process 100 can further include configuring the deadbands outside edges of the neighboring channels. Responsive to there being no neighboring channels to the NMC including neighboring channels replaced with Amplified Spontaneous Emission (ASE), the process 100 can further include configuring the deadbands outside edges of the NMC. Responsive to there being one neighboring channel to the NMC on one side and no neighboring channel on another side, the process 100 can further include configuring the deadband on an edge of the one neighboring channel on the one side and on an edge of the NMC on the another side.

The modem can be configured by reducing a baud rate of the modem when deadbands are configured outside edges of the neighboring channels. The MC can include a plurality of NMCs. The MC can include a single NMC. The deadbands can include a portion of optical spectrum used to avoid filter-roll off penalties. The loopback test can include an optical transmission from a transmitter of the modem to a receiver of the modem through one of the degree and add/drop components. Prior to the modem being available, the loopback test can be performed with Amplified Spontaneous Emission (ASE) between the multiplexer and demultiplexer components.

ASE Loopback

FIG. 6 is a diagram of the portion of the ROADM 10 from FIG. 1 for illustrating a photonic loopback utilizing ASE 150. This approach can be used prior to the availability of the modem, for the loopback test, including configuring the deadbands as described herein. This ASE loopback can be done to validate connections between channel-mux/demux and section-mux by generating ASE from a mux-amp, namely ASE 150 in FIG. 6. Such loopback is useful for connection validation in a configuration where no modem is available during initial installation time, or when line system is not yet calibrated (no power available from line demux).

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A Reconfigurable Optical Add/Drop Multiplexer (ROADM) comprising:
   one or more of degree and add/drop components where there are one or more Media Channels (MCs) configured thereon;
   multiplexer and demultiplexer components; and
   a controller configured to
       responsive to a request for a loopback test on Network Media Channel (NMC) that is part of a configured Media Channel (MC), determine whether there are neighboring channels to the NMC,
       configure deadbands on optical spectrum based on the determining,
       cause configuration of a modem for the loopback test, and
       cause performance of the loopback test with the modem.

2. The ROADM of claim 1, wherein, responsive to there being neighboring channels to the NMC, the controller is configured to configure the deadbands outside edges of the neighboring channels.

3. The ROADM of claim 1, wherein, responsive to there being no neighboring channels to the NMC including neighboring channels replaced with Amplified Spontaneous Emission (ASE), the controller is configured to configure the deadbands outside edges of the NMC.

4. The ROADM of claim 1, wherein, responsive to there being one neighboring channel to the NMC on one side and no neighboring channel on another side, the controller is configured to configure the deadband on an edge of the one neighboring channel on the one side and on an edge of the NMC on the another side.

5. The ROADM of claim 1, wherein the modem is configured by reducing a baud rate of the modem when deadbands are configured outside edges of the neighboring channels.

6. The ROADM of claim 1, wherein the MC includes a plurality of NMCs.

7. The ROADM of claim 1, wherein the MC includes a single NMC.

8. The ROADM of claim 1, wherein the deadbands include a portion of optical spectrum used to avoid filter-roll off penalties.

9. The ROADM of claim 1, wherein the loopback test includes an optical transmission from a transmitter of the modem to a receiver of the modem through one of the degree and add/drop components.

10. The ROADM of claim 1, wherein, prior to the modem being available, the loopback test is performed with Amplified Spontaneous Emission (ASE) between the multiplexer and demultiplexer components.

11. A method comprising steps of:
    responsive to a request for a loopback test on Network Media Channel (NMC) that is part of a configured Media Channel (MC), determining whether there are neighboring channels to the NMC;
    configuring deadbands on optical spectrum based on the determining;
    configuring a modem for the loopback test; and
    performing the loopback test with the modem.

12. The method of claim 11, wherein, responsive to there being neighboring channels to the NMC, the steps further include configuring the deadbands outside edges of the neighboring channels.

13. The method of claim 11, wherein, responsive to there being no neighboring channels to the NMC including neighboring channels replaced with Amplified Spontaneous Emission (ASE), the steps further include configuring the deadbands outside edges of the NMC.

14. The method of claim 11, wherein, responsive to there being one neighboring channel to the NMC on one side and no neighboring channel on another side, the steps further include configuring the deadband on an edge of the one neighboring channel on the one side and on an edge of the NMC on the another side.

15. The method of claim 11, wherein the modem is configured by reducing a baud rate of the modem when deadbands are configured outside edges of the neighboring channels.

16. The method of claim 11, wherein the MC includes a plurality of NMCs.

17. The method of claim 11, wherein the MC includes a single NMC.

18. The method of claim 11, wherein the deadbands include a portion of optical spectrum used to avoid filter-roll off penalties.

19. The method of claim 11 wherein the loopback test includes an optical transmission from a transmitter of the modem to a receiver of the modem through one of the degree and add/drop components.

20. The method of claim 11, wherein, prior to the modem being available, the loopback test is performed with Amplified Spontaneous Emission (ASE) between the multiplexer and demultiplexer components.

* * * * *